Patented Feb. 7, 1933

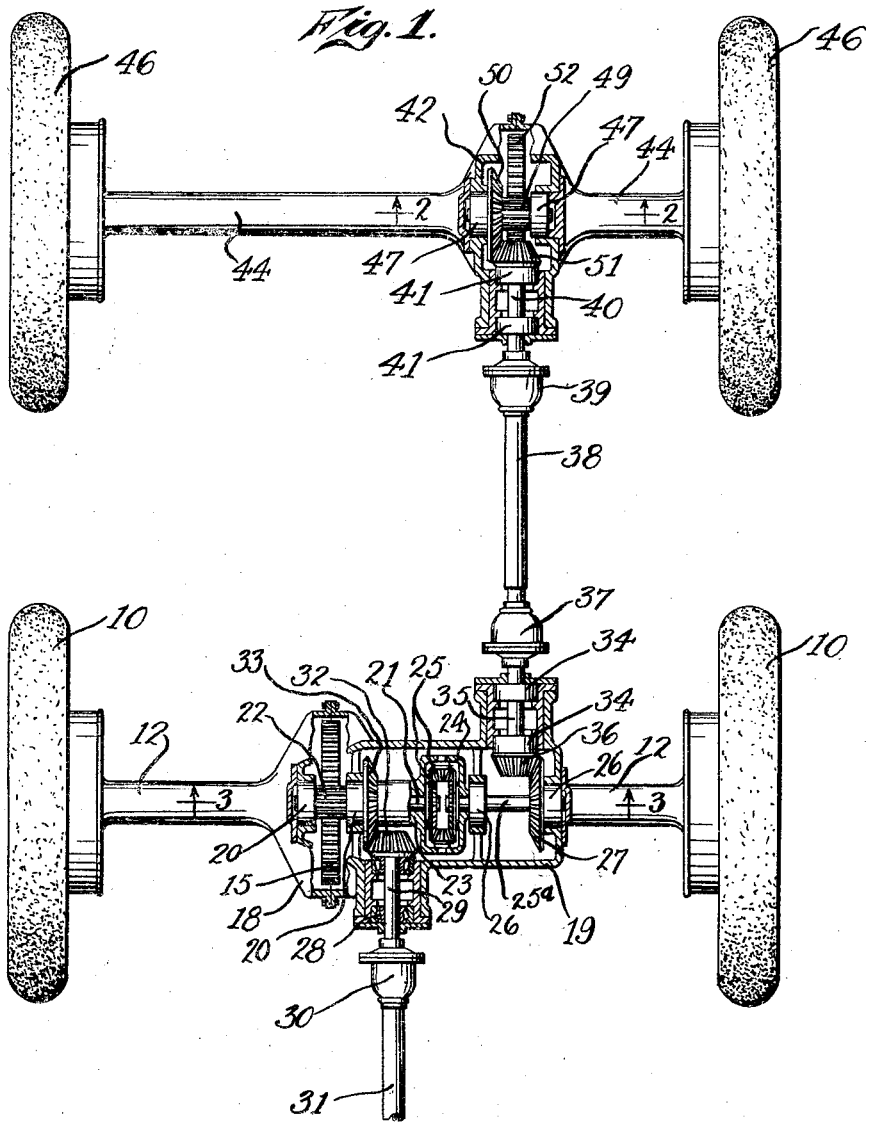

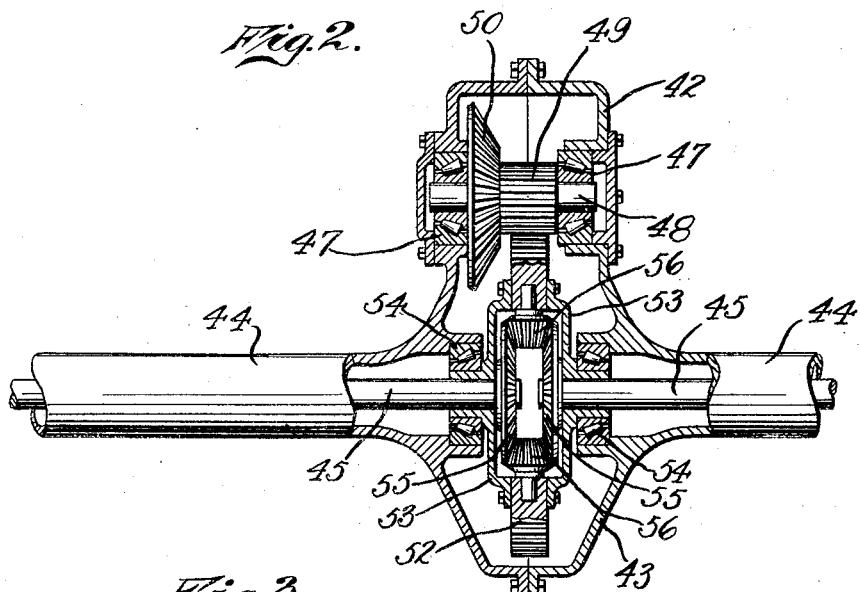
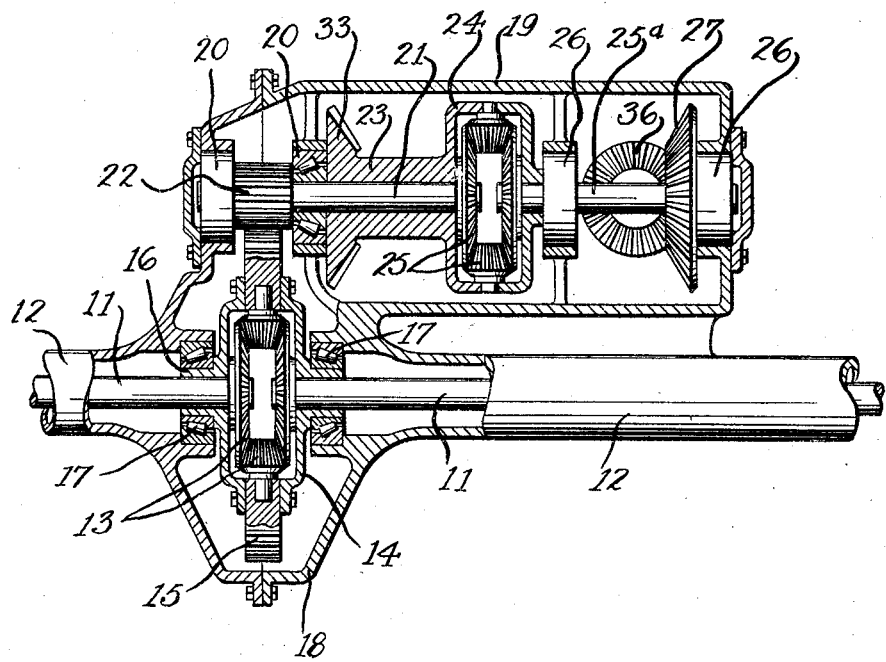

1,896,664

UNITED STATES PATENT OFFICE

HARVEY A. DE WOLFE, OF SANTA ANA, CALIFORNIA

MULTIPLE DRIVE FOR MOTOR VEHICLES

Application filed February 11, 1930. Serial No. 427,512.

My invention relates generally to power transmitting mechanism and more particularly to a multiple drive for motor vehicles or any operating mechanism where it is desired to effect a uniform transmission of motion and power to a plurality of rotating members such as shafts or wheels, and the principal object of my invention is, to provide a relatively simple, practical and efficient driving mechanism wherein the rotary motion and power from a motor may be transmitted to the driving axles of a motor vehicle or the like.

The particular form of driving mechanism herein illustrated and described is especially designed for use in a six wheel vehicle having a four wheel rear drive, but it will be understood that the construction contemplated by my invention may be with slight modifications, advantageously utilized in connection with vehicles and six or more driven wheels and likewise with airplanes or dirigible aircraft having two or more driven propeller carrying shafts.

Further objects of my invention are, to generally improve upon and simplify the construction of the existing forms of four wheel drive mechanisms, further, to provide a strong rugged and yet flexible construction wherein power is uniformly distributed among four or more traction wheels of a motor vehicle, truck or tractor and further, to provide a multiple drive of the character referred to wherein a differential gear is arranged between the driving axles of a four wheel drive, so as to permit any one of the driven wheels to traverse a rut or depression in the roadway or to pass over an elevation on the surface of the roadway without producing a variation of action or operation between the other three driving wheels of the four wheel drive.

With the foregoing and other objects in view, my invention consists in certain novel features of construction and arrangement of parts that will hereinafter be more fully described and claimed and illustrated in the accompanying drawings, in which:

Fig. 1 is a plan view of a four wheel drive embodying the principles of my invention and with the gear housings in horizontal section in order to more clearly illustrate the driving mechanisms that are contained within said housings.

Fig. 2 is an enlarged vertical section taken on the line 2—2 of Fig. 1.

Fig. 3 is an enlarged vertical section taken on the line 3—3 of Fig. 1.

Referring by numerals to the accompanying drawings which illustrate a practical embodiment of my invention, 10, 10 designate the front wheels of a four wheel drive, which wheels are mounted in the conventional manner on axles 11, the latter being contained in suitable axle housings 12 and the inner ends of said axles 11 being connected by a standard form of differential gearing 13. This differential gearing 13 is arranged in housing 14 that is mounted on the central portion of a gear wheel 15 and the latter having hubs 16 that are journaled in suitable anti-friction bearings 17.

These bearings are supported in the sides of a housing 18 that constitutes a part of the axle housings 12 and formed integral with or fixed to the upper portion of housing 18 and occupying a position directly above one of the axle housings 12 is a housing 19.

Journaled in suitable bearings 20 in one end of housing 19, is a shaft 21, on which is fixed a pinion 22 that meshes with gear wheel 15.

Mounted to rotate freely on shaft 21 is a sleeve 23 with which is formed integral a housing that contains a standard form of differential gearing 25 and one of the larger pinions of said differential gearing is fixed to shaft 21. The opposite one of the large gear wheels of this differential is fixed on a shaft 25ª that is in axial alignment with shaft 21, said shaft being journaled in suitable bearings 26 within the housing 19 and fixed on said shaft 25 is a beveled gear wheel 27.

Journaled in suitable bearings 28 on the front side of housing 19 is a shaft 29 that is connected by a suitable universal joint 30 to the main drive shaft 31 and which latter is driven from a suitable motor, for instance, an internal combustion engine.

Secured on the inner end of shaft 29 is a beveled pinion 32 that meshes with a beveled gear wheel 33 that is formed integral with or fixed to sleeve 23.

Journaled in suitable bearings 34 on the rear side of the housing 19 is a shaft 35 on the forward end of which is fixed a beveled pinion 36 that meshes with the beveled gear wheel 27.

The outer end of shaft 35 is connected by a suitable universal joint 37 to a shaft 38 and the rear end of the latter is connected by a suitable universal joint 39 to a shaft 40 that is journaled in bearings 41 and the latter being located in the forward portion of a housing 42.

This housing surmounts a housing 43 that constitutes a part of axle housings 44, within which are arranged for operation axles 45 that carry on their outer ends traction wheels 46.

Journaled in suitable bearings 47 in housing 42 is a transversely disposed shaft 48 and fixed thereon is a straight pinion 49 and a beveled gear wheel 50, the latter meshing with a beveled pinion 51 that is secured on the rear end of shaft 40.

Pinion 49 meshes with a gear wheel 52, the central portion of which is constructed so as to form a housing 53 and the latter being journaled in bearings 54 that are located in the sides of housing 43.

Housing 53 contains a conventional form of differential gearing that comprises a pair of beveled wheels 55 that are mounted respectively on the inner ends of the axles 45 and arranged between the beveled gear wheels and meshing therewith are beveled pinions 56 that are journaled in the gear wheel 52.

In the operation of my improved multiple drive the rotary motion and power of driving shaft 31 is transmitted through shaft 29 and pinion 32 to gear wheel 33 that is mounted on shaft 21, and, through differential gear 25 contained within housing 24 that is fixed to sleeve 23, shafts 21 and 25ª are driven.

The motion and power of shaft 21 is transmitted by pinion 22 to gear wheel 15 and through the differential gearing 13 contained within housing 14 that forms a part of gear wheel 15, this rotary motion and power is transmitted to axles 11 that carry the traction wheels 10.

The rotary motion and power delivered to shaft 25ª is transmitted to shaft 38 through beveled gear wheels 27, 36 and shaft 35 and through shaft 40 and beveled pinion 51 this rotary motion and power is transmitted to beveled gear wheel 50 that is mounted on shaft 48.

Pinion 49 carried by shaft 48 drives gear wheel 52 and the differential gearing within housing 53 that forms a part of said gear wheel drives the axles 45 that carry the traction wheels 46.

Thus it will be seen that the rotary motion and power of the drive shaft 31 is transmitted equally to the axles carrying the four traction wheels and the tractive effect produced by said wheels is utilized in driving forward, the vehicle with which said wheels are associated.

One of the particularly advantageous features of my improved multiple drive is the arrangement and construction whereby the power from the driving shaft 31 is transmitted directly to the housing 24 that contains the differential gearing 25 and which latter is disposed between the differential gearing 13 between the axle sections 11 and the differential gearing within housing 53 between the axle sections 45.

As a result of this direct drive of the intermediate or interposed differential gearing the power transmitted by the driving shaft is divided in the differential that is driven and such power is transmitted and evenly distributed between the axle sections 11 and 45.

Inasmuch as the parts of each axle are connected by a differential gearing either wheel of either pair of wheels may operate at increased or decreased speed independently of the other wheel of the pair and by providing the differential gearing 25 in the driving connections between the two axles either one of the two axles and its wheels may operate at increased or decreased speed relative to the other axle and its wheels.

I am aware that two or more wheel carrying axles, each having a differential gearing, have been connected by various forms of driving mechanism, but insofar as I am aware I am the first to arrange a driving connection between a pair of driving axles and which driving connection includes a differential gearing and which arrangement insures a uniform distribution of driving power between the four driving wheels.

The particular form of multiple drive herein shown and described is especially applicable to six wheel trucks having four driving wheels but with slight modifications the principles of my invention may be advantageously employed in a six wheel drive as required for driving tractors or for a truck that has a trailer associated therewith. Likewise my improved multiple drive may be found advantageous in the operation of airplanes or aircraft having a plurality of propeller carrying shafts.

Thus it will be seen that I have provided a multiple drive for motor vehicles and the like that is relatively simple in construction and which is very effective in performing the functions for which it is intended.

It will be understood that minor changes in the size, form and construction of the various parts of my improved multiple drive for motor vehicles may be made and substituted for those herein shown and described without departing from the spirit of my invention, the scope of which is set forth in the appended claims.

I claim as my invention:

1. In a multiple drive for vehicles, a pair of driving axles, each formed in two parts, a differential gearing connecting the two parts of each axle, a two part shaft journaled for rotation in bearings and arranged parallel with one of the two-part axles, driving connections between one of the parts of said two-part shaft and the other one of the two-part axles, a differential gearing connecting the two parts of said shaft, a housing enclosing said differential gearing, a beveled pinion on said housing, a driving shaft, a beveled pinion carried by said driving shaft and meshing with the beveled pinion on said differential gear housing, said two-part shaft, the differential gearing that connects the two parts of said shaft, said differential gear housing and the beveled pinion carried by the differential gear housing, all being located directly above and supported by the two-part axle with which the two-part shaft is associated, and a driving connection between the other one of the parts of the two-part shaft and the differential gearing that connects the parts of the axle that is positioned adjacent to and parallel with said two-part shaft.

2. In a multiple drive for vehicles, a pair of driving axles each formed in two parts, a differential gearing connecting the two parts of each axle, a housing for each two-part axle and the differential gearing that connects the two parts of each axle, a housing supported by and arranged directly above one of the two-part axle housings, a two-part shaft journaled for rotation in bearings in said second mentioned housing and arranged parallel with the adjacent two-part axle, a driving connection between one of the parts of said two-part shaft and the differential gearing that connects the two parts of the adjacent axle, a differential gearing connecting the two parts of said two-part shaft, a housing for said differential gearing, a beveled pinion carried by said housing, a driving shaft, a beveled pinion mounted on said driving shaft and meshing with the beveled pinion on said differential gear housing, a shaft arranged between the two-part shaft and the other one of the two-part axles, driving connections between said shaft and the differential gearing between the parts of said other two-part axle and driving connections between said shaft and the other part of said two-part shaft.

3. In a multiple drive for vehicles, a pair of driving axles each formed in two parts, a differential gearing connecting the two parts of each axle, an external ring gear forming a part of each differential gearing, a housing for each two-part axle and the differential gearing that connects the two parts of each axle, a housing supported by and arranged directly above the housing for one of the two-part axles, a two-part shaft journaled in bearings in said second mentioned housing and arranged parallel with the adjacent two-part axle, a pinion carried by one of the parts of said two-part shaft and meshing with the external ring gear on the adjacent different gear, a differential gearing connecting the parts of said two-part shaft, a housing for said differential gearing, a beveled pinion on said housing, a driving shaft, a beveled pinion carried by said driving shaft and meshing with the beveled pinion on said housing and driving connections between the other part of said two-part shaft and the ring gear on the differential that connects the two parts of the other one of said two-part axles.

4. In a multiple drive for vehicles, a pair of driving axles each formed in two parts, a differential gearing connecting the two parts of each axle, an external ring gear forming a part of each differential gearing, a housing supported by and arranged directly above one of the two-part axles, a two-part shaft journaled in bearings in said housing and disposed parallel with the adjacent two-part axle, a pinion secured on one of the parts of said two-part shaft and meshing with the external ring gear on the adjacent differential gearing, a differential gearing connecting the parts of said two-part shaft, a housing for said differential gearing, a beveled pinion on said housing, a driving shaft, a beveled pinion carried by said driving shaft and meshing with the pinion on said differential gear housing, a shaft arranged between the housing for the two-part shaft and the differential gearing of the other two-part axle, driving connections between said shaft and the other part of said two-part shaft and driving connections between said shaft and the ring gear of the differential that connects the parts of said other two-part axle.

In testimony whereof I affix my signature.

HARVEY A. DE WOLFE.